US012308595B2

(12) United States Patent
Wu

(10) Patent No.: US 12,308,595 B2
(45) Date of Patent: May 20, 2025

(54) COMPOSITE ELASTIC WIRING DEVICE

(71) Applicants: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

( * ) Notice: Subject to any disclaimer, the term of this patent is extended or adjusted under 35 U.S.C. 154(b) by 362 days.

(21) Appl. No.: 18/108,028

(22) Filed: Feb. 10, 2023

(65) Prior Publication Data

US 2024/0275085 A1 Aug. 15, 2024

(51) Int. Cl.
*H01R 9/26* (2006.01)
*H01R 4/28* (2006.01)
(Continued)

(52) U.S. Cl.
CPC ............. *H01R 9/2616* (2013.01); *H01R 4/28* (2013.01); *H01R 4/4837* (2023.08); *H01R 13/62905* (2013.01); *H01R 4/483* (2023.08)

(58) Field of Classification Search
CPC ............ H01R 9/2616; H01R 13/62905; H01R 4/4816; H01R 4/48185; H01R 4/4823; H01R 4/483; H01R 4/4837; H01R 4/28
See application file for complete search history.

(56) References Cited

U.S. PATENT DOCUMENTS 10,164,349 B2 * 12/2018 Koellmann .......... H01R 4/4821
10,230,179 B2 * 3/2019 Wilinski ................ H01R 4/483
11,424,558 B2 * 8/2022 Stjepanovic ........... H01R 4/483

FOREIGN PATENT DOCUMENTS

DE 17938 A1 1/1985
DE 202009010003 U1 12/2009
(Continued)

OTHER PUBLICATIONS

Office Action dated Nov. 17, 2023 of the corresponding German patent application No. 102023105244.6.

*Primary Examiner* — Renee S Luebke
*Assistant Examiner* — Paul D Baillargeon
(74) *Attorney, Agent, or Firm* — Chun-Ming Shih; LANWAY IPR SERVICES

(57) ABSTRACT

A composite elastic wiring device includes a shell, an operating assembly and a connecting terminal disposed in the shell. The shell is formed with a wire hole. The operating assembly includes an operating member, a first elastic sheet and at least one second elastic sheet. One end of the operating member has a first abutting portion and a second abutting portion, another end of the operating member is disposed with a triggering portion outside the shell. The first elastic sheet and the second elastic sheet are stacked. The first elastic sheet and the second elastic sheet have a first pressing end and a second pressing end, respectively. The first and second pressing ends blocking the wire hole in order. A wire in the wire hole is pressed by the first elastic sheet and the second elastic sheet.

10 Claims, 7 Drawing Sheets

(51) Int. Cl.
*H01R 4/48* (2006.01)
*H01R 13/629* (2006.01)

(56) References Cited

FOREIGN PATENT DOCUMENTS

| | | | |
|---|---|---|---|
| DE | 102012011794 | A1 | 12/2013 |
| DE | 102013000713 | A1 | 7/2014 |
| DE | 202013101582 | U1 | 7/2014 |
| DE | 202017107209 | U1 | 3/2019 |

* cited by examiner

COMPOSITE ELASTIC WIRING DEVICE

BACKGROUND OF THE DISCLOSURE

Technical Field

The disclosure relates to an electric connector, particularly to a composite elastic wiring device.

Related Art

In a related-art wiring device such as a terminal block, when the wire is inserted, an elastic sheet is used to abut against the wire to serve as a clamping point of the wire in a connective status, so as to maintain a conductive status with the wire.

However, because such a wiring device only uses the single elastic sheet to serve as a clamping point of the wire, the contact status therebetween is unstable. Particularly, when an outer section of the wire sways, shakes of the wire easily occur because of the single clamping point. There may be risk of loosening.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY OF THE DISCLOSURE

An object of the disclosure is to provide a composite elastic wiring device, which uses multiple elastic sheets to press a wire to increase clamping points to the wire, so as to improve stability of inserting connection and prevent the wire from shaking or loosening.

To accomplish the above object, the disclosure provides a composite elastic wiring device, which includes a shell, an operating assembly, and a connecting terminal. The shell is formed with a hollow portion inside and a wire hole communicating outside from the hollow portion. The operating assembly is disposed in the hollow portion and includes an operating member, a first elastic sheet and at least one second elastic sheet. One end of the operating member has a first abutting portion and a second abutting portion, another end of the operating member is disposed with a triggering portion outside the shell. The first elastic sheet and the second elastic sheet are stacked with each other. The first elastic sheet and the second elastic sheet have a first pressing end and a second pressing end, respectively. The first and second pressing ends block the wire hole in order. The connecting terminal is disposed in the hollow portion and is adjacent to the wire hole. The connecting terminal has multiple pins projecting from the shell. The first abutting portion is disposed pivotally in the hollow portion. The first abutting portion has a first abutting face. The second abutting portion is disposed on the first abutting portion and has at least one second abutting face projecting from the first abutting face. The first abutting face is adjacent to the first pressing end corresponding to the first elastic sheet. The second abutting face is adjacent to the second pressing end corresponding to the second elastic sheet.

Furthermore, the first abutting portion has a pivoting portion disposed pivotally on an inner wall of the hollow portion of the shell.

Furthermore, each of the first abutting portion and the second abutting portion is a cam structure.

Furthermore, the first abutting portion is indented with an engaging trough, and an engaging block is disposed in the shell corresponding to the engaging trough.

Furthermore, the first elastic sheet includes a first elastic section, a first fixed end formed on one end of the first elastic section, the first pressing end is formed on another end of the first elastic section, the second elastic sheet includes a second elastic section, a second fixed end formed on one end of the second elastic section, and the second pressing end is formed on another end of the second elastic section.

Furthermore, the connecting terminal is provided with a positioning portion for positioning the first fixed end and the second fixed end.

Furthermore, the first elastic section and the second elastic section have an arcuate portion respectively, an inner wall of the hollow portion of the shell is disposed with a protruding bar correspondingly, and the first elastic section and the second elastic section surrounds the protruding bar through the arcuate portions.

Furthermore, each of the second elastic sheet and the second abutting face is multiple in number.

Furthermore, the connecting terminal includes a terminal body disposed vertically and a wire carrying portion bent from the terminal body, the terminal body abuts against a side of the hollow portion of the shell, and the wire carrying portion is corresponding to a side in the wire hole of the shell.

Furthermore, the wire carrying portion is disposed with a bump structures.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
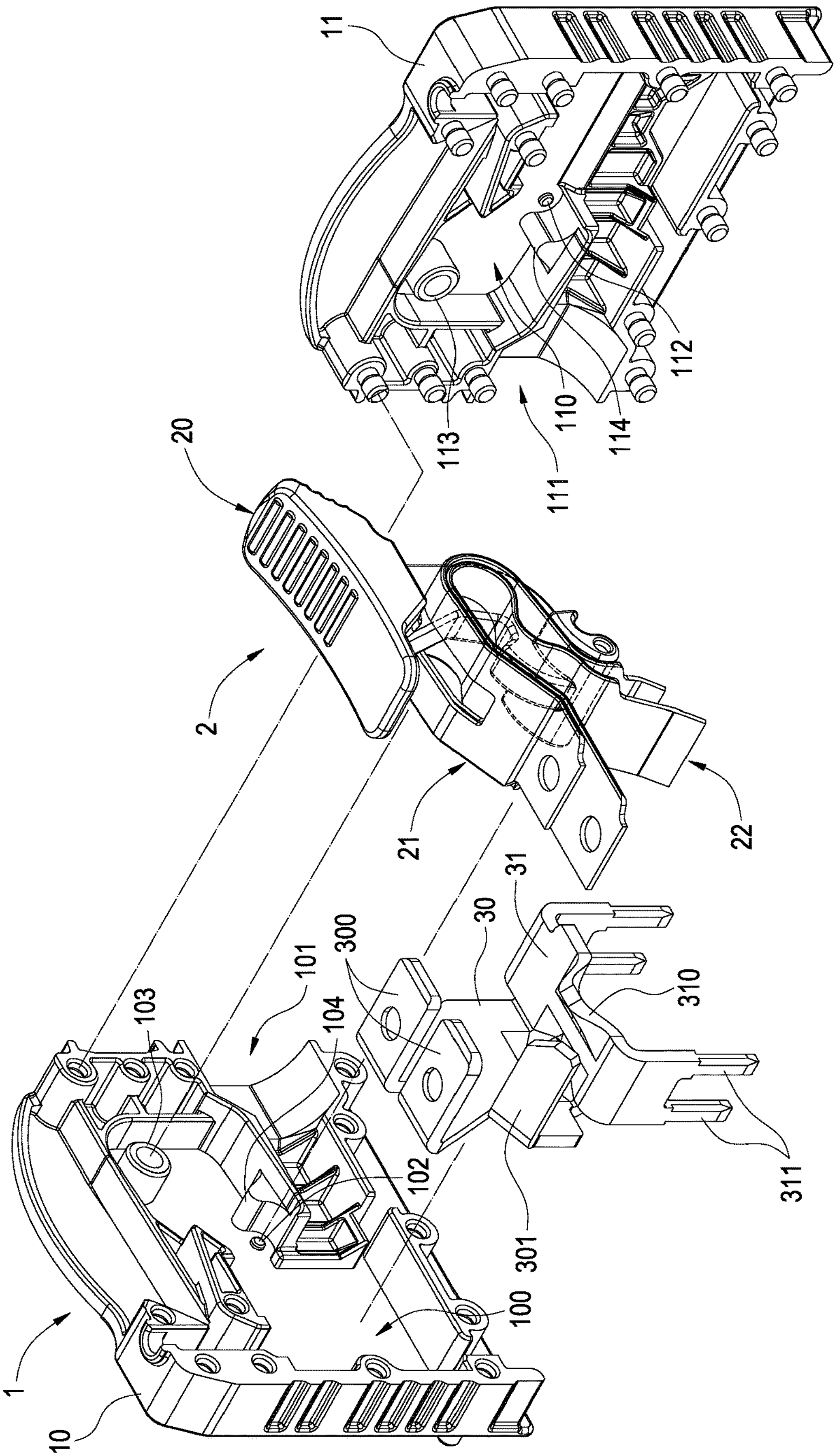
FIG. 1 is an exploded view of the disclosure.

Please refer to FIG. 1, which is an exploded view of the disclosure. The disclosure provides a composite elastic wiring device, which includes a shell 1, an operating assembly 2 and a connecting terminal 3.

Figure 4:
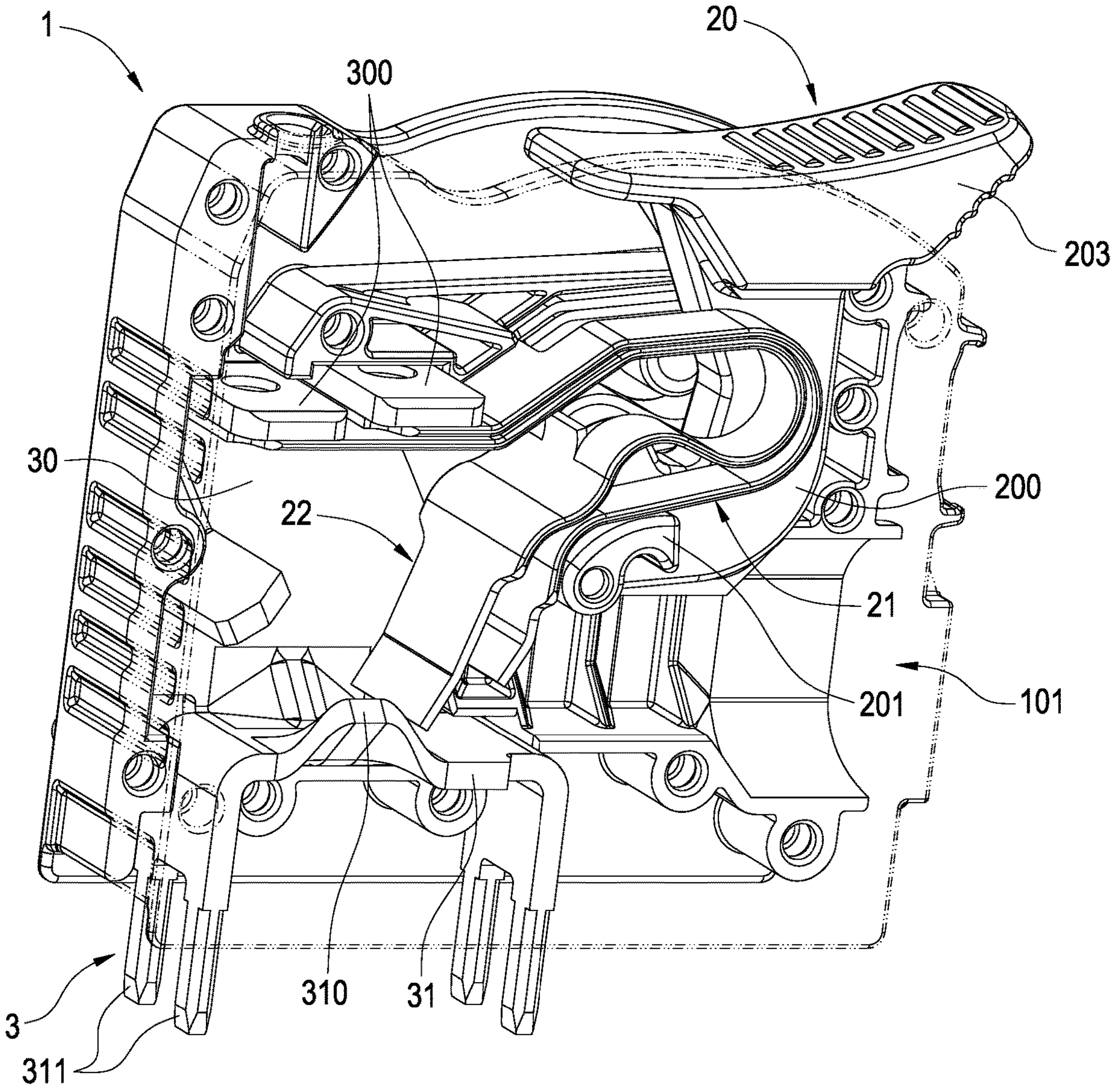
FIG. 4 is an assembled schematic view of the internal structure of the disclosure.
Figure 6:
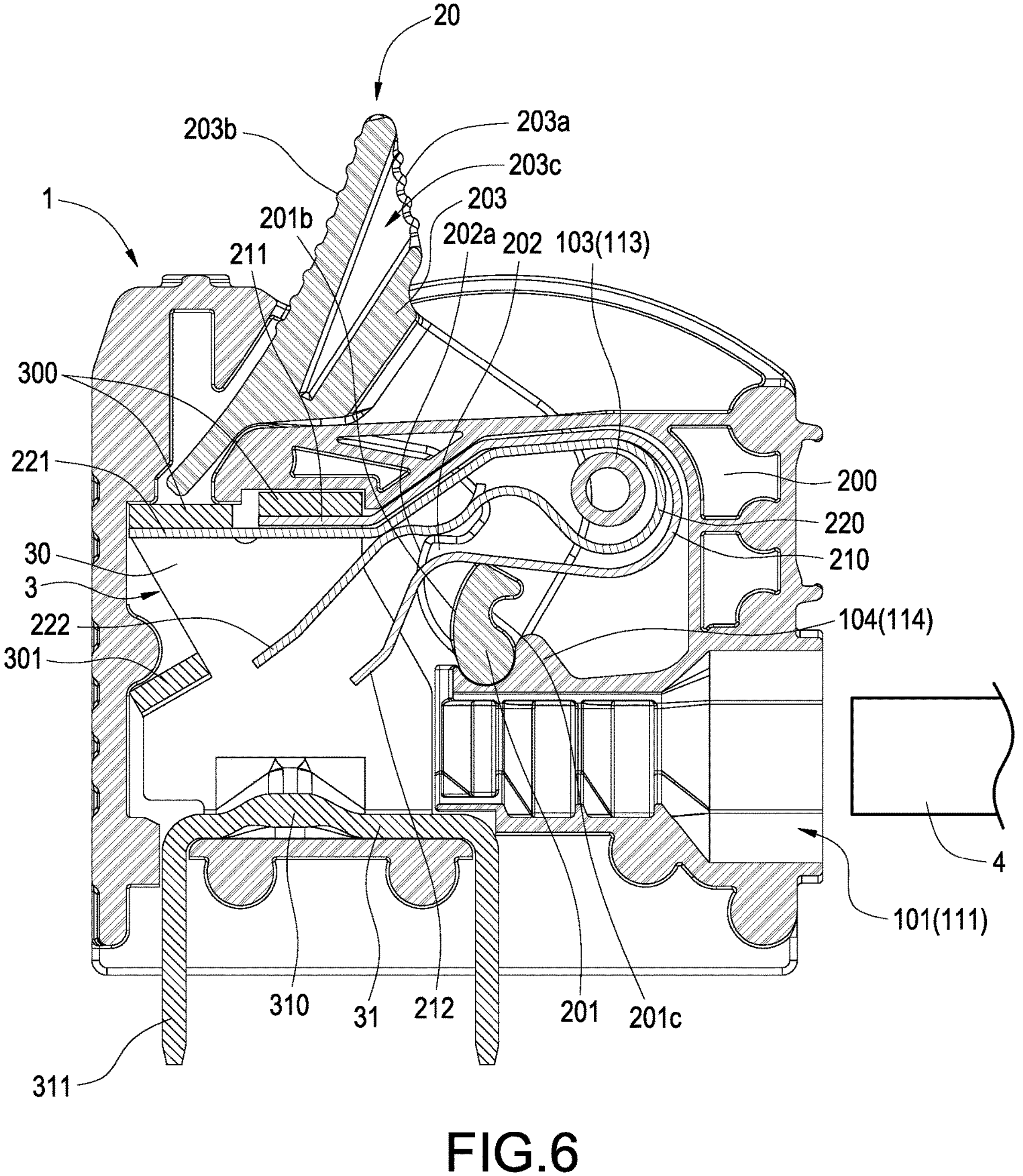
FIG. 6 is a schematic view of action of the disclosure before a wire is inserted.
Figure 7:
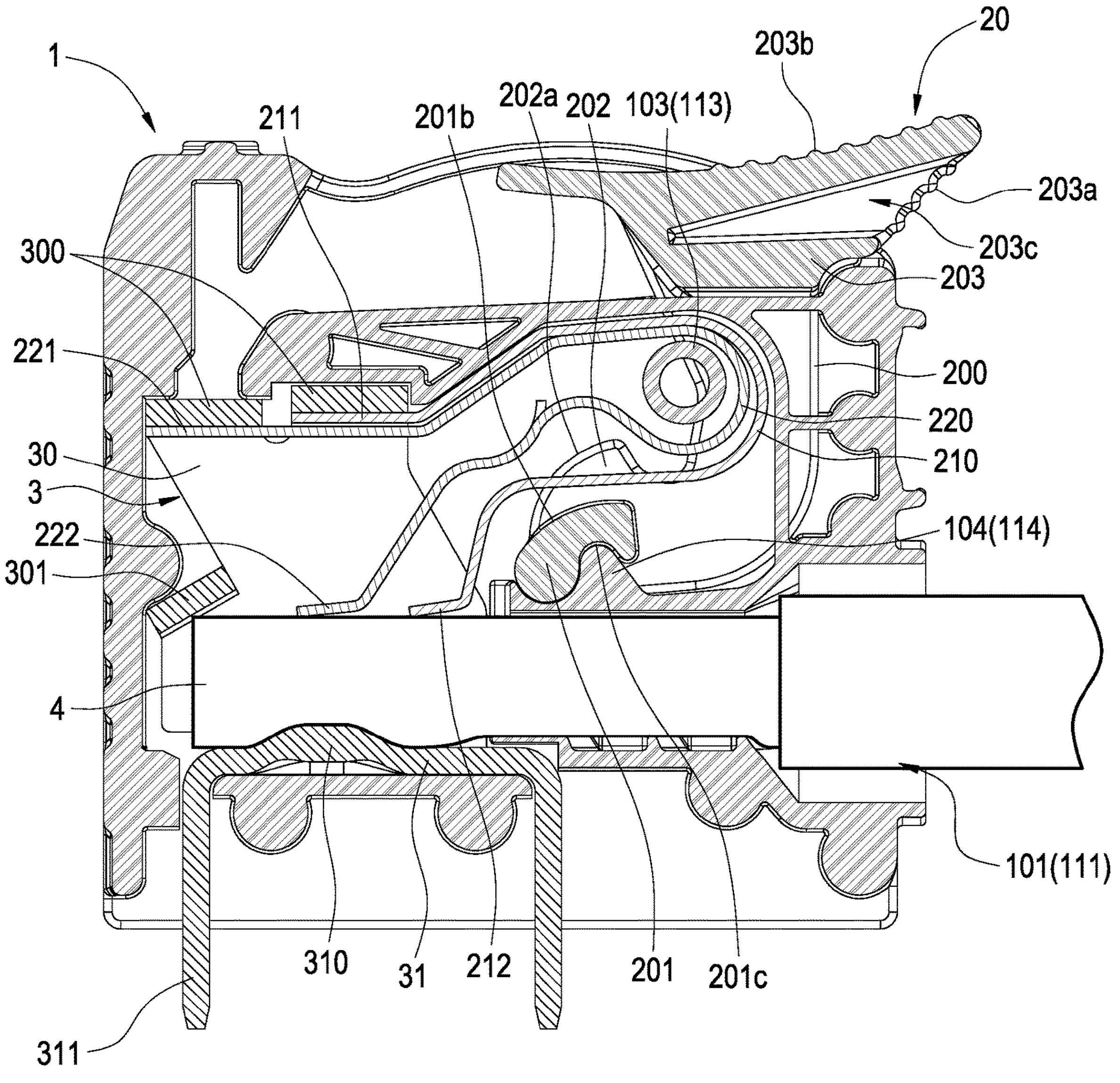
FIG. 7 is a schematic view of action of the disclosure after a wire is inserted.

The shell 1 may be assembled by two half portions 10, 11, and formed with a hollow portion 100, 110 inside and a wire hole 101, 111 communicating outside of the shell 1 from the hollow portion 100, 110. The hollow portion 100, 110 may allow the operating assembly 2 and the connecting terminal 3 to be arranged as shown in FIG. 4. The wire hole 101, 111 is used for being inserted by a wire 4 as shown in FIG. 6 or 7.

Figure 2:
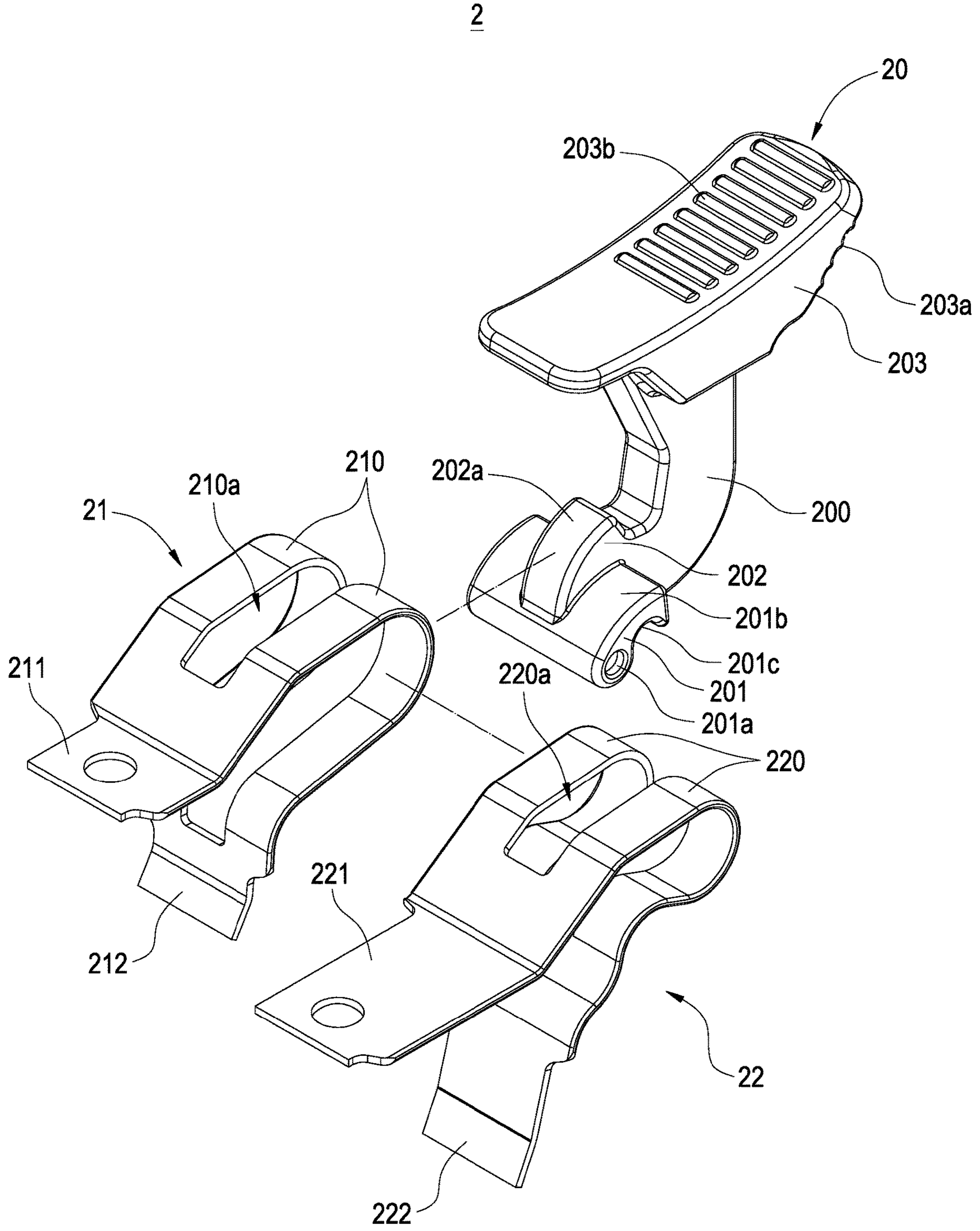
FIG. 2 is an exploded view of the operating assembly of the disclosure.
Figure 3:
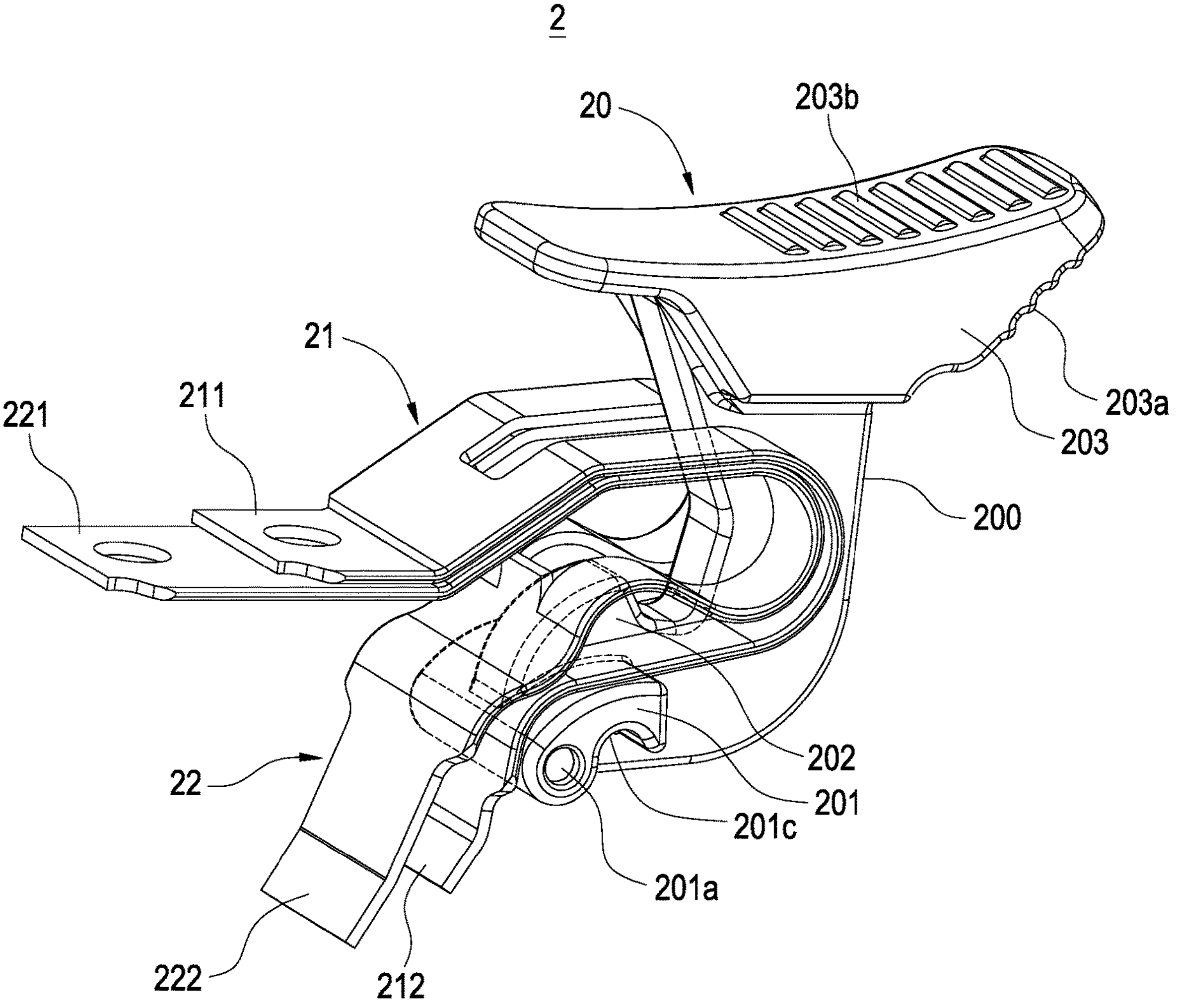
FIG. 3 is a perspective assembled schematic view of the operating assembly from another viewpoint.

Please refer to FIGS. 2 and 3. The operating assembly 2 includes an operating member 20, a first elastic sheet 21 and at least one second elastic sheet 22. The operating member 20 has a lever 200, a first abutting portion 201 and a second abutting portion 202 disposed on one end of the lever 200, and a triggering portion 203 disposed on the other end of the lever 200. The first abutting portion 201 has a pivoting portion 201*a* pivoted by a shaft 102, 112 disposed on an inner wall of the hollow portion 100, 110 of the shell 1 to make the operating member 20 sway about the pivoting portion 201*a*. The first abutting portion 201 has a first abutting face 201*b*. The second abutting portion 202 is disposed on the first abutting portion 201 and has at least one second abutting face 202*a* projecting from the first abutting face 201*b*. Each of the first abutting portion 201 and the second abutting portion 202 may be formed by a cam structure to separately form the first abutting face 201*b* and the second abutting face 202*a* by their respective cam faces.

The first elastic sheet 21 and the second elastic sheet 22 are stacked with each other. The first elastic sheet 21 has a first elastic section 210, a first fixed end 211 formed on one end of the first elastic section 210, and a first pressing end 212 formed on the other end of the first elastic section 210. The second elastic sheet 22 also has a second elastic section 220, a second fixed end 221 formed on one end of the second elastic section 220, and a second pressing end 222 formed on the other end of the second elastic section 220. After the first and second elastic sheets 21, 22 are stacked with each other, a side of the first elastic section 210 of the first elastic sheet 21, which is adjacent to the first pressing end 212, is corresponding to the first abutting face 201*b*, and a side of the second elastic section 220 of the second elastic sheet 22, which is adjacent to the second pressing end 222, is corresponding to the second abutting face 202*a*. In the shown embodiment, in order to facilitate the integration of the operating member 20 and the first and second elastic sheets 21, 22, the first elastic section 210 may be formed with a first slot 210*a*, and the second elastic section 220 is formed with a second slot 220*a*. The width of the first slot 210*a* and the second slot 220*a* may be adapted to accommodate part of the lever 200 respectively, so as to prevent the components from interfering or conflicting under the condition of limited space.

Figure 5:
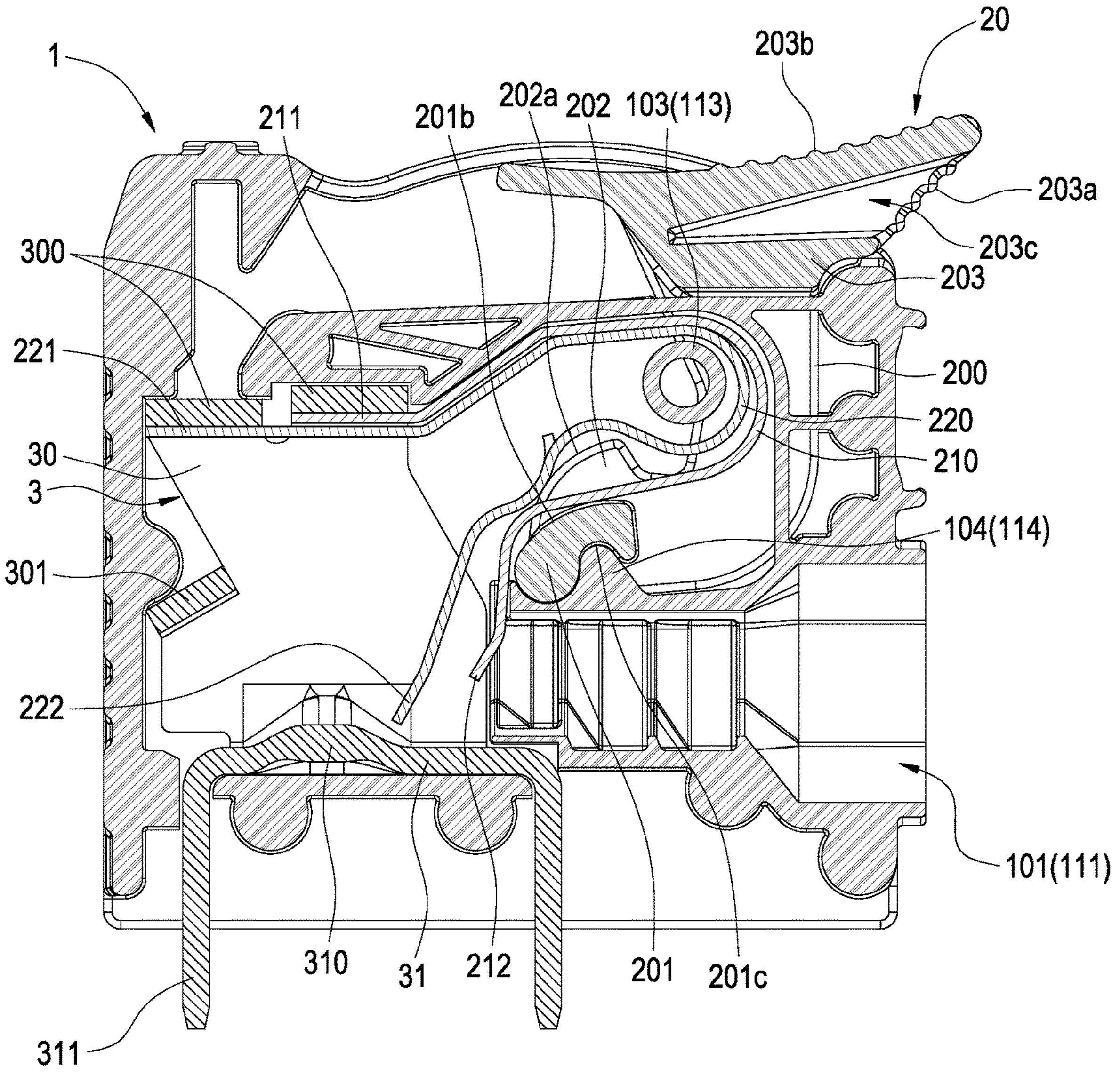
FIG. 5 is a cross-sectional schematic view of the internal structure of the disclosure.

In addition, as shown in FIG. 5, in order to facilitate the deformation of the first and second elastic sheets 21, 22 under force, the first elastic section 210 and the second elastic section 220 are of an arcuate shape and may be corresponding to the protruding bar 103, 113 of the inner walls of the hollow portion 100, 110 of the shell 1 as shown in FIG. 1, so that the arcuate portion may surround the protruding bar 103, 113.

Please refer to FIGS. 1 and 4. The connecting terminal 3 has a terminal body 30 disposed vertically and a wire carrying portion 31 bent from the terminal body 30. The terminal body 30 may abut against a side in the hollow portion 100 of the shell 1 and makes the wire carrying portion 31 be located corresponding to a side of the wire hole 101, 111 of the shell 1. The terminal body 30 is provided with a positioning portion 300 for positioning the first fixed end 211 and the second fixed end 221 of the first and second elastic sheets 21, 22. A side of the terminal body 30, which is away from the wire hole 101, 111, is provided with a wire blocking portion 301. The wire carrying portion 31 may be disposed with one or more bump structures 310 for increasing the contact capability with the wire 4. The wire carrying portion 31 is downward bent to form one or more pins 311 projecting from the shell 1. In addition, as shown in FIG. 5, when the first and second elastic sheets 21, 22 are not pressed by a force, the first pressing end 212 and the second pressing end 222 of the first and second elastic sheets 21, 22 sways to the wire carrying portion 31 and block the wire hole 101, 111 in order.

As a result, by the above structure, the composite elastic wiring device of the disclosure may be obtained.

Accordingly, as shown in FIGS. 5 and 6, when the wire 4 is inserted into the wire hole 101, 111, a user uses hand to trigger the triggering portion 203 of the operating member 20, the triggering portion 203 extends outside the shell 20 so as to make the lever 200 drive the first abutting portion 201 and the second abutting portion 202 to turn over when the triggering portion 203 is triggered, and the first abutting face 201*b* of the first abutting portion 201 pushes the first elastic section 210 of the first elastic sheet 21 and the second abutting face 202*a* of the second abutting portion 202 pushes the second elastic section 220 of the second elastic sheet 22 as shown in FIG. 6. As a result, the first pressing end 212 and the second pressing end 222 move toward a side away from the wire hole 101, 111 and release the inner space of the wire hole 101, 111 to allow the wire 4 to be smoothly inserted until reaching the wire carrying portion 31 of the connecting terminal 3 as shown in FIG. 7.

Next, as shown in FIG. 7, after the triggering portion 203 is triggered back to the original position by hand, it may be further positioned by the first abutting portion 201 being latched in the shell 1. In detail, the lower portion of the first abutting portion 201 is indented with an engaging trough 201*c*, and an engaging block 104, 114 is disposed in the shell 1 corresponding to the engaging trough 201*c*. The engaging block 104, 114 may be structured by the inner walls of the two half portions 10, 11 extended and connected with each other or a rib formed in the shell 1 serves as support of the engaging block 104, 114 to provide sufficient structural strength to make the engaging trough 201*c* be engaged with the engaging block 104, 114. Also, this guarantees that the first pressing end 212 of the first elastic sheet 21 and the second pressing end 222 of the second elastic sheet 22 separately press the wire with their elasticity.

Furthermore, for facilitating triggering the triggering portion 203 of the operating member 20 by hand, it is also available to form a first triggering face 203*a* on the triggering portion 203 and a second triggering portion 203*b* opposite to the first triggering face 203*a*. When inserting the wire 4 as shown in FIG. 6, a force may be exerted on the first triggering face 203*a* to lift the triggering portion 203, and when the wire 4 is inserted to a required position as shown in FIG. 7, a force may be exerted on the second triggering face 203*b* to return the triggering portion 203 back to the original position. In addition, the first triggering face 203*a* may also be disposed with an operating hole 203*c* for being inserted by a tool (not shown in figures), so that the tool may be used to operate.

It is noted that the second elastic sheet 22 of the disclosure may be further configured to be multiple and they are stacked with the first elastic sheet 21 and the second elastic sheet 22 together. Also, the second abutting face 202*a* may be increased corresponding to the amount of the second elastic sheets 22 to further increase the clamping points to the wire 4.

As a result, the composite elastic wiring device of the disclosure utilizes multiple elastic sheets (such as the first elastic sheet 21 and the second elastic sheet 22) to press the wire 4 to increase the clamping points to the wire 4 to further enhance the stability of insertion and further prevent the wire 4 from loosening or escaping. In addition, the operating assembly 2 may use the first abutting portion 201 and the second abutting portion 202 to serve as a cam structure to make the operating member 20 implement the operation by means of the principle of leverage. This makes the wire 4 convenient and rapid in wiring and removing wire to accomplish the object of toolless operation to improve the working efficiency of workers to be helpful in reducing the labor cost.

While this disclosure has been described by means of specific embodiments, numerous modifications and variations could be made thereto by those skilled in the art without departing from the scope and spirit of this disclosure set forth in the claims.

What is claimed is:

1. A composite elastic wiring device comprising:

a shell, comprising a hollow portion defined inside and a wire hole communicating with outside from the hollow portion:

an operating assembly, disposed in the hollow portion, comprising an operating member, a first elastic sheet and at least one second elastic sheet, the operating member comprising a first abutting portion and a second abutting portion disposed on one end thereof and a triggering portion disposed on another end thereof outside the shell, the first elastic sheet and the second elastic sheet stacked with each other, the first elastic sheet comprising a first pressing end, the second elastic sheet comprising a second pressing end, and the first pressing end and the second pressing end blocking the wire hole in order; and a connecting terminal, disposed in the hollow portion adjacent to the wire hole, and comprising multiple pins disposed protrusively from the shell;

wherein the first abutting portion is disposed pivotally in the hollow portion, the first abutting portion comprising a first abutting face, the second abutting portion is disposed on the first abutting portion and comprises at least one second abutting face disposed protrusively on the first abutting face, the first abutting face is located adjacent to the first pressing end corresponding to the first elastic sheet, and the second abutting face is located adjacent to the second pressing end corresponding to the second elastic sheet.

2. The composite elastic wiring device of claim 1, wherein the first abutting portion comprises a pivoting portion disposed pivotally on an inner wall of the hollow portion of the shell.

3. The composite elastic wiring device of claim 1, wherein each of the first abutting portion and the second abutting portion comprises a cam structure.

4. The composite elastic wiring device of claim 1, wherein the first abutting portion comprises an engaging trough disposed concavely, and an engaging block is disposed in the shell corresponding to the engaging trough.

5. The composite elastic wiring device of claim 1, wherein the first elastic sheet comprises a first elastic section and a first fixed end disposed on one end of the first elastic section, the first pressing end is disposed on another end of the first elastic section, the second elastic sheet comprises a second elastic section and a second fixed end disposed on one end of the second elastic section, and the second pressing end is disposed on another end of the second elastic section.

6. The composite elastic wiring device of claim 5, wherein the connecting terminal comprises a positioning portion for the first fixed end and the second fixed end to be positioned.

7. The composite elastic wiring device of claim 6, wherein the first elastic section and the second elastic section comprises an arcuate portion respectively, the shell comprises a protruding bar disposed on an inner wall of the hollow portion thereof, and the first elastic section and the second elastic section surrounds the protruding bar through the arcuate portion.

8. The composite elastic wiring device of claim 5, wherein the first elastic section and the second elastic section comprises an arcuate portion respectively, the shell comprises a protruding bar disposed on an inner wall of the hollow portion thereof, and the first elastic section and the second elastic section surrounds the protruding bar through the arcuate portion.

9. The composite elastic wiring device of claim 1, wherein the connecting terminal comprises a terminal body disposed vertically and a wire carrying portion bent from the terminal body, the terminal body abuts against a side of the hollow portion of the shell, and the wire carrying portion is located corresponding to a side of the wire hole of the shell.

10. The composite elastic wiring device of claim 9, wherein the wire carrying portion comprises a bump structure disposed protrusively.

* * * * *